United States Patent Office 3,817,914
Patented June 18, 1974

3,817,914
SULFUR CONTAINING DERIVATIVES OF DIALKYL-4-HYDROXYPHENYLTRIAZINE
Martin Dexter, Briarcliff Manor, and Martin Knell, Ossining, N.Y., and Heimo Brunetti, Reinach, Basel-Land, Switzerland, assignors to Ciba-Geigy Corporation, Ardsley, N.Y.
No Drawing. Original application July 2, 1971, Ser. No. 159,566, now Patent No. 3,709,883. Divided and this application Oct. 24, 1972, Ser. No. 299,998
Int. Cl. C08f 45/60; C08g 51/60
U.S. Cl. 260—45.8 N          9 Claims

ABSTRACT OF THE DISCLOSURE

Novel sulfur derivatives of dialkyl-4-hydroxyphenyltriazine were prepared which are stabilizers of organic material. Certain of these compounds can be prepared (1) by direct alkylation of 2,6-dialkylphenol with a 2,4-bis(alkylthio)-6-chloro-1,3,5-triazine compound; (2) by the reaction of an alkyl mercaptan with the appropriate 6(3',5'-dalkyl-4'-hydroxyphenyl)2,4-dichloro - 1,3,5 - triazine; or (3) by the reaction of an acid chloride of dialkylhydroxybenzoic or phenylalkanoic acid with a mono or dialkyl substituted dithiobiuret. A typical embodiment of this invention is 6(3',5'-di-t-butyl-4'-hydroxyphenyl)-2,4-bis(n-octylthio)-1,3,5-triazine. The compounds of this invention are useful as stabilizers of organic materials which are subject to oxidative and thermal deterioration.

---

This is a division of our copending application Ser. No. 159,566, filed July 2, 1971, now U.S. Pat. 3,709,883.

DETAILED DESCRIPTION

This invention relates to novel sulfur derivatives of dialkyl-4-hydroxyphenyltriazine which are useful as stabilizers for organic materials which are subject to thermal and oxidative deterioration. The compounds of this invention are represented by the formula

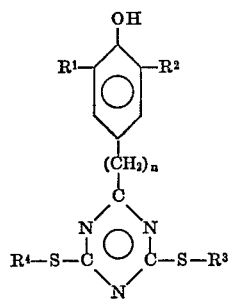

I wherein
each of $R^1$ and $R^2$ is a (lower) alkyl of from 1 to 6 carbon atoms;
$R^3$ is alkyl of from 1 to 18 carbon atoms;
$R^4$ is hydrogen or alkyl of from 1 to 18 carbon atoms; and
$n$ is 0 or 2.

Each of $R^3$ and $R^4$ is the same or different alkyl groups of from 1 to about 18 carbon atoms such as methyl, ethyl, propyl, pentyl, octyl, decyl, dodecyl, octadecyl and the like, both branched and straight chained, $R^4$ may optionally be a hydrogen atom.

The dialkyl-4-hydroxyphenyl derivatives of triazine are useful as stabilizers of organic materials normally subject to oxidative and thermal deterioration. Such organic materials include: synthetic organic polymeric substances such as vinyl resins formed from the polymerization of vinyl halides or from the copolymerization of vinyl halides with vinylesters and unsaturated hydrocarbons such as butadienes and styrene; poly-α-olefins such as polyethylene, polypropylene, polybutylene, polyisoprene, polybutadiene, and the like, including copolymers of poly-α-olefins; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

In general, one or more of the stabilizers of the present invention are employed in amounts, in toto, of from about 0.005 to about 5% by weight of the composition to be stabilized. A particularly advantageous range of the present stabilizers is from about 0.05% to about 2%. The preferred range is particularly effective in polyolefins such as polypropylene.

These compounds may be incorporated in the polymer substance during the usual processing operations, for example, by hot-milling, the composition then being extruded, pressed, roll-molded or the like into films, fibers, filaments, hollow spheres and the like. The heat stabilizing properties of these compounds advantageously stabilize the polymer against degradation during such processing at the high temperatures generally encountered.

The stabilizers employed in this invention can be also used in combination with other stabilizers or additives. Especially useful co-stabilizers are dilauryl-β-thiodipropionate and distearyl-β-thiodipropionate.

The following formula represents co-stabilizers which are in certain instances very useful in combination with the stabilizers of this invention:

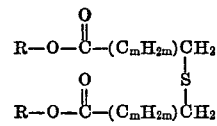

II wherein R is an alkyl group having from 6 to 24 carbon atoms; and $m$ is an integer from 1 to 6. The above co-stabilizers are used in the amount of from 0.1 to 2% by weight of the organic material, and preferably from 0.1 to 1%.

Other antioxidants, antiozonants, thermal stabilizers, ultraviolet light absorbers, coloring materials, dyes, pigments, metal chelating agents, etc., may also be used in the compositions in combination with the stabilizers of the invention.

The compounds of this invention wherein $n$ of formula I is 0 and $R^4$ is other than H, may be prepared by the alkylation of 2,6-dialkylphenol having the formula

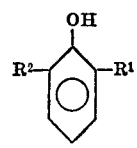

III wherein $R^1$ and $R^2$ are as previously defined with 2,4-bis-(n-alkylthio)-6-chloro-1,3,5-triazine having the formula

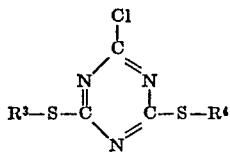

IV wherein $R^3$ and $R^4$ are as previously defined, said alkylation reaction being carried out in a common Friedel crafts type reaction solvent such as carbon disulfide, ethylene chloride and nitrobenzene at room temperature and catalyzed with aluminum chloride. The above mentioned 2,4-bis(n-alkylthio)-6-chloro-1,3,5-triazine compounds can be prepared as described in U.S. Pat. No. 3,255,191. This method is preferred when $R^1$ and $R^2$ are linear and not branched.

An alternative method involves the reaction of a 2(3',5'-dialkyl-4'-hydroxyphenyl)-4,6-dichloro - 1,3,5 - triazine compound having the formula

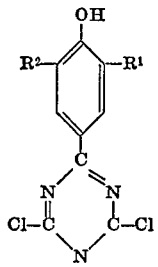

V wherein $R^1$ and $R^2$ are as previously defined, with an alkali or alkaline earth metal salt of an alkylmercaptan. The alkyl portions of the mercaptans thus being defined by $R^3$ and $R^4$. Each of the two chlorine atoms present on the triazine nucleus may be displaced by the same or different type of thioalkyl group.

This latter method is preferred when either or both of $R^1$ or $R^2$ is an alkyl group which is branched at the $\alpha$ carbon atom, e.g., a t-butyl group.

The 6(3',5'-dialkyl-4'-hydroxyphenyl) - 2,4 - dichloro-1,3,5-triazine compound may be prepared by reacting a sodium salt of the above mentioned 2,6-dialkylphenol with cyanuric chloride in a non-aqueous aprotic solvent such as dioxane.

The compounds of this invention wherein $n$ of formula I is 0, 1 or 2 may be prepared by reacting an acid chloride of a dialkyl-4-hydroxybenzoic or dialkyl-4-hydroxyphenylalkanoic acid of the formula

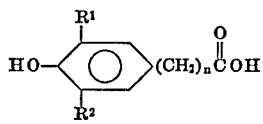

VI wherein $R^1$, $R^2$ and $n$ are as previously defined with a mono or dialkyl substituted dithiobiuret of the formula

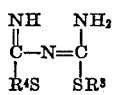

VII wherein $R^3$ and $R^4$ are as previously defined, said reaction being carried out in an inert solvent at about 70° C. in the presence of a tertiary amine acid scavenger. The compounds of formula VII are prepared by alkylation of dithiobiuret with methyl sulfate or an alkyl halide.

The acids of formula VI where $n$ is 1 can be prepared for example through chloromethylation of an alkylphenol (such as are described as starting materials in U.S. Pat. No. 2,838,571) followed by treatment with sodium or potassium cyanide and hydrolysis of the resultant alkylhydroxyphenylacetonitrile. The acids of formula VI where $n$ is two can be readily prepared by the methods described in U.S. Pat. No. 3,247,240 while said acids wherein $n$ is 0 are prepared according to methods described in Belgian Pat. No. 6,804,624.

The acid chloride of the acids of formula VI are obtained through the use of thionyl chloride.

The following examples, presented for illustration and not limitation, will serve to typify further the nature of the present invention.

EXAMPLE 1

6(3',5'-di-t-butyl-4'-hydroxyphenyl)-2,4-dichloro-1,3,5-triazine

To 18.35 g. of cyanuric chloride dissolved in dioxane at 5° C. was added 22.83 g. of sodium 2,6-di-t-butylphenoxide over a period of 10 to 15 minutes. The reaction was maintained below 10° C. for 1 hour after which it was warmed to room temperature and filtered. The filtrate was washed with dioxane and dried under reduced pressure at room temperature. The product was recrystallized from petroleum ether and had a melting point of 178–179° C.

Analysis.—Calculated for $C_{17}H_2N_3Cl_2O$ (percent): C, 57.63; H, 5.98; Cl, 20.03; N, 11.80. Found (percent): C, 57.39; H, 6.11; Cl, 19.64; N, 11.42.

EXAMPLE 2

6(3',5'-di-t-butyl-4'-hydroxyphenyl)-2,4-bis(n-octylthio)-1,3,5-triazine

To 10 ml. of ethanol was added 0.26 g. of sodium. After the sodium dissolved, 1.72 g. of n-octylmercaptan was added to the solution followed by the addition of 1.98 g. of 6(3',5'-di-t-butyl-4'-hydroxyphenyl) - 2,4 - dichloro - 1,3,5 - triazine. The reaction mixture was then heated to boiling after which 10 ml. of water was added and the reaction mixture allowed to cool to room temperature. An oil separated out from the solution which solidified on cooling. The product was filtered and washed with 20 ml. of water after which it was recrystallized twice from methanol. The product had a melting point of 69–70° C.

Analysis.—Calculated for $C_{33}H_{55}N_3S_2O$ (percent): C, 68.91; H, 9.66; S, 11.17. Found (percent): C, 68.99; H, 9.45; S, 10.81.

By following the same procedure, 6(3',5'-di-t-butyl-4'-hydroxyphenyl)-2,4-bis(n-hexylthio) - 1,3,5 - triazine is prepared by substituting an equivalent amount of n-hexyl mercaptan to replace n-octylmercaptan.

Similarly, 6(3',5' - di - t - butyl - 4' - hydroxyphenyl)-2,4'-bis(n - octadecylthio) - 1,3,5 - triazine is prepared by substituting an equivalent amount of n-octadecyl mercaptan to replace n-octylmercaptan.

EXAMPLE 3

6(3',5'-dimethyl-4'-hydroxyphenyl)-2,4-bis(n-octylthio)-1,3,5-triazine (a) 2,4 - bis(n-octylthio) - 6 - chloro - 1,3,5 - triazine: A solution of 36.8 parts of cyanuric chloride, 58.4 parts of n-octylmercaptan and 0.3 parts by volume of pyridine in 100 parts by volume of xylene was refluxed for 6 hours with nitrogen passed through the reactant, until the evolution of hydrogen chloride had ceased. The solution was separated by filtration from a small amount of insoluble material, the solvent removed under vacuum, and the residue was then vacuum distilled to yield the desired product. Boiling point 206–208/0.07 mm.

(b) 6(3',5' - dimethyl - 4' - hydroxyphenyl)2,4-bis(n-octylthio)-1,3,5-triazine: To the reaction flask was added 40.4 g. of 2,4-bis(n-octylthio)-6-chloro-1,3,5-triazine, 100 ml. of carbon disulfide and 13.3 g. of aluminum chloride. The reaction mixture was stirred under a nitrogen atmosphere for 20 minutes after which 30 ml. of carbon disulfide containing 12.2 g. of 2,6-dimethylphenol was added dropwise. The reaction mixture was refluxed for 3 hours. The carbon disulfide was boiled off and to the residue was added 100 ml. of 5 normal hydrochloric acid. To this mixture was added 100 ml. of water and 200 ml. of hexane after which the product was filtered and washed with water. The product thus obtained was air-dried and had a melting point of 75–76° C.

*Analysis.*—Calculated for $C_{27}H_{43}N_3S_2O$ (percent): C, 66.22; H, 8.85; N, 8.58; S, 13.10. Found (percent): C, 65.96; H, 8.85; N, 8.54; S, 13.14.

EXAMPLE 4

6[2'(3'',5''-di-t-butyl-4''-hydroxyphenyl)ethyl]-2,4-bis(methylthio)-1,3,5-triazine (a) To 8.2 g. of S,S'-dimethyldithiobiuret in 50 ml. toluene a solution of 15 g. of (3,5-di-t-butyl-4-hydroxyphenyl)propionyl chloride in 30 ml. toluene was added dropwise at a temperature of 10–15° C. After 15 minutes, 5 g. of triethylamine were dropped in. The temperature was raised to 50° C. and kept for 12 hours. 100 ml. water were added, the toluene layer was separated and evaporated to dryness. The remaining yellow oil was dissolved in methanol. After a few hours, crystals had separated which were filtered off and dried. The yield of the product was 11.8 g. After recrystallization from hexane, the product had a melting point of 79° C.

By utilizing equivalent amounts of (3,5-di-t-butyl-4-hydroxyphenyl)acetyl chloride and 3,5-di-t-butyl - 4 - hydroxybenzoyl chloride in place of (3,5-di-t-butyl-4-hydroxyphenyl)propionyl chloride there is respectively obtained, 6(3,5-di-t-butyl - 4 - hydroxybenzyl)-2,4-bis(methylthio)-1,3,5-triazine, M.P. 100° C. and 6(3',5'-di-t-butyl-4'-hydroxyphenyl)2,4 - bis(methylthio) - 1,3,5 - triazine, M.P. 174° C.

(b) Preparation of S,S'-dimethyldithiobiuret: 135 grams of dithiobiuret were dissolved in 350 ml. of dioxane. The mixture was heated to 75° C. and 252 g. of dimethyl sulfate was added with stirring over a 10 minute period. The reaction was continued for about 2 hours after which 300 ml. of dioxane was distilled off. The residue was dissolved in 350 ml. of water and cooled to 0° C. A 30% by weight sodium hydroxide solution was added to this solution over a 1 hour period (final pH 8–9). The precipitated product was filtered, washed with water and dried. The product (88 g.) was recrystallized from toluene and had a melting point of 94° C.

EXAMPLE 5

6[2'(3'',5''-di-t-butyl-4''-hydroxyphenyl)ethyl]-2-mercapto-4-octylthio-1,3,5-triazine (a) By following the procedure of Example 4, but utilizing equivalent amounts of S-octyldithiobiuret in place of S,S'-dimethyldithiobiuret, there was obtained 6[2'(3'',5''-di-t-butyl-4''-hydroxyphenyl)ethyl] - 2 - mercapto - 4 - octylthio-1,3,5-triazine, M.P. 158° C.

Similarly the use of (3,5-di-t-butyl-4-hydroxyphenyl)-acetyl chloride with S-octyldithiobiuret yields 6(3,5-di-t-butyl-4-hydroxybenzyl) - 2 - mercapto - 4 - octylthio-1,3,5-triazine, M.P. 141° C.

(b) The S-octyldithiobiuret was prepared as follows. To 135 g. of dithiobiuret in 300 ml. ethyleneglycol monomethyl ether were added 210 g. of n-octyl bromide dropwise at 70° C. After 12 hours the solvent was distilled off at 12 mm. The residue was dissolved in toluene and hexane was added after which the mixture was cooled to 0° C. The solvent was decanted from the semicrystalline precipitate which was dissolved again in glacial acetic acid. The solution was poured on ice water and stirred for 2 hours. The solid was filtered, stirred with hexane in a beaker until it had completely crystallized, filtered and dried. The product had a melting point of 75–77° C.

EXAMPLE 6

By following the procedure of Example 4, but utilizing equivalent amounts of S-methyldithiobiuret in place of S,S'-dimethyldithiobiuret, there was obtained 6[2''-(3'', 5''-di-t-butyl - 4'' - hydroxyphenyl)ethyl] - 2 - mercapto-4-methylthio-1,3,5-triazine, M.P. 199–200° C.

The S-methyldithiobiuret was prepared by following essentially the same procedure for preparing the corresponding dimethyl derivative in Example 1 but by using approximately one-half the equivalent amount of dimethylsulfate.

EXAMPLE 7

6[2'(3'',5''-di-t-butyl-4''-hydroxyphenyl)ethyl]-2,4-bis(octylthio)-1,3,5-triazine To 9.8 g. of 6[2'(3'',5''-di-t-butyl-4''-hydroxyphenyl)ethyl] - 2 - mercapto-4-octylthio-1,3,5-triazine in 20 ml. methanol were added 1.4 g. sodium methylate and 100 mg. potassium iodide. The mixture was stirred for 20 minutes, 4.8 g. octylbromide were added and the temperature was raised to reflux. After 24 hours, the mixture was acidified with acetic acid and evaporated to dryness. The oily residue was purified by column chromatography (silica gel, elution by toluene). The product had a melting point of 49–50° C.

By utilizing an equivalent amount of dodecyl bromide in place of octyl bromide there was obtained 6[2'(3'',5''-di - t - butyl - 4''-hydroxyphenyl)ethyl]-2-dodecylthio-4-octylthio-1,3,5-triazine, B.P. 0.001 mm., 215–218° C.

EXAMPLE 8

A batch of unstabilized polypropylene powder (Hercules Profax 6501) was thoroughly blended with 0.5% by weight of various compounds of this invention. The blended materials were then milled on a two-roll mill at 182° C., for 10 minutes, after which time the stabilized polypropylene was sheeted from the mill and allowed to cool.

The milled polypropylene sheets were then cut into pieces and pressed for 7 minutes on a hydraulic press at 218° C., 2,000 pounds per square inch pressure. The resulting sheet of 25 mil thickness were tested for resistance to accelerated aging in a forced draft oven at 150° C. The results are set out in Table I below:

TABLE I

| Additive(s): | Oven aging at 150° C., hours to failure |
|---|---|
| 0.5% of 6(3',5' - di-t-butyl-4'-hydroxyphenyl)-2,4-bis(n-octylthio)-1,3,5-triazine | 520 |
| 0.1% of 6(3',5' - di-t-butyl-4'-hydroxyphenyl)-2,4 - bis(n - octylthio)-1,3,5-triazine+0.5% DLTDP * | 595 |
| 0.5% of 6(3',5'-dimethyl-4'-hydroxyphenyl)-2,4-bis(n-octylthio)-1,3,5-triazine | 820 |
| 0.1% of 6(3',5' - dimethyl-4'-hydroxyphenyl)-2,4 - bis(n - octylthio)-1,3,5-triazine+0.5% DLTDP * | 1645 |
| 0.5% DLDTP * | 300 |
| Unstabilized polypropylene | 3 |

*Dilaurylthiodipropionate (a synergist for phenolic antioxidants).

The above data clearly indicates the significant increase in the stabilization of polypropylene upon addition of the antioxidants of the present invention.

EXAMPLE 9

To 39.3 g. (0.15 moles) of hexamethylene diammonium adipate is added 0.177 g. ($7.5 \times 10^{-4}$ mole; 0.5 mole percent) of hexamethylene diammonium diacetate as molecular weight control agent, and 0.183 g. (0.5% of theoretical nylon yield) of 6(3',5'-dimethyl-4'-hydroxyphenyl)-2,4-bis(n-octylthio)-1,3,5-triazine. The mixture is blended thoroughly and added to a Pyrex polymer tube.

The polymer tube is evacuated three times and each time filled with high purity nitrogen. The polymer tube with the continuously maintained, slightly positive nitrogen pressure, is placed in a methyl salicylate vapor bath at 220° C. After one hour at 220° C. the polymer tube is transferred to an o-phenyl-phenol bath at 285° C. for one hour. The polymer tube is kept in the 285° C. vapor bath for an additional ½ hour while it is maintained under vacuum of less than 1 mm. pressure. High purity nitrogen is then readmitted and the polymer tube is allowed to cool.

The nylon-6,6 obtained is ground in a mill at ambient temperature of 25° C. About 2 g. are heated in a small glass Petri dish in a circulating air-rotary oven at 140° C. for 65 hours. The viscosity of a 1% sulfuric acid solution of aged and unaged polymer samples are determined at 25° C. Stabilizer effectiveness is judged by the percent retention of specific viscosity, color-formation, and weight retention after oven aging. The stabilized polyamide has better viscosity, color retention and substantially less weight loss after oven aging than a polyamide which is unstabilized.

Stabilized polyamide compositions are prepared in a similar manner as above with the following stabilizers:

(a) 0.5% of 6(3',5'-di-t-butyl-4'-hydroxyphenyl)-2,4-bis(n-dodecylthio)-1,3,5-triazine
(b) 0.5% of 6(3',5'-di-t-butyl-4'-hydroxyphenyl)-2,4-bis(n-hexylthio)-1,3,5-triazine
(c) 0.5 %of 6(3',5'-di-t-butyl-4'-hydroxyphenyl)-2,4-bis(n-octodecylthio)-1,3-triazine Substantially similar results are obtained when 0.5% of the aforementioned stabilizers are incorporated into nylon-6,6 flakes before extrusion.

EXAMPLE 10

A quantity of SBR emulsion containing 100 g. of rubber (500 ml. of 20% SBR obtained from Texas, U.S., Synpol 1500) previously stored under nitrogen, is placed in a beaker and stirred vigorously. The pH of the emulsion is adjusted to 10.5 with a 0.5 N NaOH solution.

To the emulsion is added 50 ml. of 25% NaCl solution. A 6% NaCl solution which has been acidified with HCl to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm. Hg and finally to constant weight under high vacuum (<1 mm.) at 40–45° C.

The dried rubber (25 g.) is heated under nitrogen at 125° C. in a Brabender mixer and to this is added with mixing 0.125 g. (0.5%) of 6(3',5'-di-t-butyl-4'-hydroxyphenyl)-2,4-bis(n-octylthio)-1,3,5-triazine. The composition is mixed for 5 minutes after which it is cooled and compression molded at 125° C. into 5" x 5" x 0.025" plaques.

The plaques are placed on aluminum sheets and heated in a circulating air oven at 100° C. for up to 96 hours. The viscosity of a 0.5% toluene solution of aged and unaged rubber samples are determined at 25° C. Stabilizer effectiveness is judged by the percent retention of specific viscosity, color formation and gel content after oven aging. The stabilized rubber has better viscosity, color retention and less gel content than the rubber which is unstabilized after oven aging.

Similar results are obtained when 6(3',5'-di-t-butyl-4'-hydroxyphenyl) - 2,4-bis(n-octadecylthio)-1,3,5-triazine is used in place of the above menitoned stabilizer in the rubber composition.

EXAMPLE 11

High impact polystyrene resin containing elastomer (i.e., butadiene-styrene) is stabilized against loss of elongation properties by incorporation of 0.5% by weight of 6(3',5'-dimethyl-4'-hydroxyphenyl)-2,4-bis(n-octylthio)-1,3,5-triazine. Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 162° C. and a pressure of 2,000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75° C. and thereafter tested for elongation.

EXAMPLE 12

Cyclohexene, freshly distilled is stabilized by the addition thereto of 0.01% by weight of (3',5'-di-t-butyl-4'-hydroxyphenyl)-2,4-bis(n-octylthio)-1,3,5 - triazine. The effectiveness of this stabilizer in cyclohexene is tested by the ASTM D525–55 oxidation test. The unstabilized cyclohexene failed after 30 minutes while the stabilized cyclohexene did not fail until 54 minutes.

EXAMPLE 13

A stabilized mineral oil composition is prepared by incorporating into a refined mineral oil of 183 S.U.S., at 100° F., (Regal Oil B. Texas Company) 0.005% by weight of 6(3',5'-di-t-butyl-4'-hydroxyphenyl)-2,4-bis(n - octylthio)-1,3,5-triazine.

EXAMPLE 14

A stabilized high temperature lubricating oil is prepared by incorporating 2% by weight of 6(3',5'-dimethyl-4'-hydroxyphenyl)-2,4-bis(n-octylthio)-1,3,5 - triazine to the lubricant, which comprises diisoamyl adipate. The stabilized composition is compared with the unstabilized lubricant by heating at 175° in the presence of air and metallic catalysts according to the test method described in Military Specification Mil–I–7808c. After 72 hours, the blank containing no stabilizer contains more sludge and has a greater viscosity than the stabilized lubricant.

EXAMPLE 15

A batch of 100 parts of unstabilized polypropylene was blended with 0.2 part by weight of various stabilizer compounds of this invention. The blended materials were processed in a Brabender plastograph at 200° C. for 5 minutes and pressed into 40 mil sheets from which test specimens of the dimensions 0.4 x 7 inches were cut out.

For testing, the specimens were aged in a forced-draft oven at 149° C. The exposure time in days to visual degradation of the specimens was noted as the end point. The results are set out in Table II below:

TABLE II

| Additive(s): | Oven aging at 149° C., days to failure |
|---|---|
| 6[2'(3",5"-di-t-butyl - 4" - hydroxyphenyl)ethyl]-2-mercapto-4-octylthio-1,3,5-triazine | 55 |
| 6(3',5'-di-t-butyl-4'-hydroxybenzyl)-2 - mercapto-4-octylthio-1,3,5-triazine | 29 |
| 6[2'(3",5"-di-t-butyl - 4" - hydroxyphenyl)ethyl]-2,4-bis(octylthio)-1,3,5-triazine | 39 |
| Unstabilized polypropylene | <<29 |

The unstabilized polypropylene failed in considerably less time than the samples containing the stabilizers of this invention.

EXAMPLE 16

A composition is prepared comprising linear polyethylene and 1.0% by weight of 6(3′,5′-di-t-butyl-4′-hydroxyphenyl)-2,4-bis(n-octylthio)-1,3,5-triazine. The composition is injected molded into tensile bars which are placed in a circulating air oven at 120° C. In contrast to those molded from unstabilized linear polyethylene, tensile bars molded from the instant composition retained its tensile strength for a substantially longer period.

EXAMPLE 17

A composition comprising an acrylonitrile butadiene-styrene terpolymer and 0.1% of 6(3′,5′-dimethyl-4′-hydroxyphenyl)-2,4-bis(n-octylthio)-1,3,5 - triazine resists discoloration at 120° C. longer than one which does not contain the stabilizer.

What is claimed is:

1. A composition of matter stabilized against oxidative deterioration which comprises a synthetic organic polymeric substance and from 0.005 to 5% by weight of a stabilizing compound having the formula

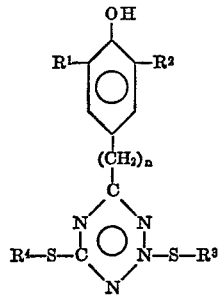

wherein
each of $R^1$ and $R^2$ is a (lower)alkyl of from 1 to 6 carbon atoms;
$R^3$ is alkyl of from 1 to 18 carbon atoms;
$R^4$ is hydrogen or alkyl of from 1 to 18 carbon atoms; and
$n$ is 1 or 2.

2. A composition of claim 1 wherein said synthetic organic polymeric substance is polyolefin.

3. A composition of claim 2 wherein $R^1$ and $R^2$ are methyl or t-butyl groups.

4. A composition of claim 3 wherein the synthetic organic polymeric substance is polypropylene.

5. A composition of claim 1 wherein the stabilizing compound is 6{2′(3″,5″-di-t-butyl-4″ - hydroxyphenyl)ethyl}-2,4-bis(methylthio)-1,3,5,-triazine.

6. A composition of claim 1 wherein the stabilizing compound is 6{2′(3″,5″-di-t-butyl-4′-hydroxyphenyl)ethyl}2-mercapto-4-methylthio-1,3,5-triazine.

7. A composition of claim 1 wherein the stabilizing compound is 6{2′(3″,5″-di-t-butyl-4″-hydroxyphenyl)ethyl} 2-mercapto-4-octylthio-1,3,5-triazine.

8. A composition of claim 1 wherein the stabilizing compound is 6{2′(3″,5″-di-t-butyl-4″-hydroxyphenyl)ethyl} 2,4-bis(octylthio)-1,3,5-triazine.

9. A composition of claim 1 wherein the stabilizing compound is 6{2′(3″,5″-di-t-butyl-4″-hydroxyphenyl)ethyl} 2-dodecylthio-4-octylthio-1,3,5-triazine.

References Cited
UNITED STATES PATENTS

| | | | |
|---|---|---|---|
| 3,118,887 | 1/1964 | Hardy et al. | 260—248 |
| 3,255,191 | 6/1966 | Dexter et al. | 260—248 |
| 3,355,504 | 11/1967 | Coffield et al. | 260—624 |
| 3,530,127 | 9/1970 | Biland et al. | 260—248 |

DONALD E. CZAJA, Primary Examiner

R. A. WHITE, Assistant Examiner

U.S. Cl. X.R.

252—47.5; 260—45.85 S